United States Patent
Feldmann

(10) Patent No.: US 11,125,163 B2
(45) Date of Patent: Sep. 21, 2021

(54) HOUSING STRUCTURE FOR A TURBOMACHINE, TURBOMACHINE AND METHOD FOR COOLING A HOUSING PORTION OF A HOUSING STRUCTURE OF A TURBOMACHINE

(71) Applicant: MTU Aero Engines AG, Munich (DE)

(72) Inventor: Manfred Feldmann, Eichenau (DE)

(73) Assignee: MTU Aero Engines AG, Munich (DE)

( * ) Notice: Subject to any disclaimer, the term of this patent is extended or adjusted under 35 U.S.C. 154(b) by 211 days.

(21) Appl. No.: 16/454,351

(22) Filed: Jun. 27, 2019

(65) Prior Publication Data

US 2020/0003121 A1   Jan. 2, 2020

(30) Foreign Application Priority Data

Jun. 28, 2018   (DE) .................... 10 2018 210 598.7

(51) Int. Cl.
  *F02C 7/18*    (2006.01)
  *F01D 25/12*   (2006.01)
  *F01D 25/24*   (2006.01)

(52) U.S. Cl.
  CPC ............... *F02C 7/18* (2013.01); *F01D 25/12* (2013.01); *F01D 25/24* (2013.01)

(58) Field of Classification Search
  CPC .......... F01D 25/12; F01D 25/24; F01D 25/14; F01D 25/26; F01D 11/10; F01D 11/127; F01D 11/24; F02C 7/18; F05D 2260/20; F05D 2240/11
  USPC ...................................................... 415/173.1
  See application file for complete search history.

(56) References Cited

U.S. PATENT DOCUMENTS

| | | | |
|---|---|---|---|
| 3,990,807 A * | 11/1976 | Sifford | F01D 11/08 415/136 |
| 4,526,226 A * | 7/1985 | Hsia | F01D 5/187 165/109.1 |
| 4,925,365 A | 5/1990 | Crozet et al. | |
| 5,179,557 A | 1/1993 | Kudo | |
| 6,179,557 B1 * | 1/2001 | Dodd | F01D 25/14 415/115 |
| 7,246,993 B2 * | 7/2007 | Bolms | F23R 3/005 415/116 |

(Continued)

FOREIGN PATENT DOCUMENTS

| | | |
|---|---|---|
| DE | 2907748 A1 | 9/1980 |
| DE | 69912539 T2 | 5/2004 |

(Continued)

*Primary Examiner* — J. Todd Newton
(74) *Attorney, Agent, or Firm* — Barlow, Josephs & Holmes, Ltd.; David Josephs

(57) ABSTRACT

The present invention relates to a housing structure for a turbomachine, a turbomachine, and a method for cooling a housing portion of a housing structure of a turbomachine, wherein the housing structure has an outer housing wall, which is formed by at least one housing part, and an inner wall, wherein the inner wall is arranged in the radial direction inside of the housing wall and spaced apart from the housing wall and is designed to bound the main flow channel, at least partially, wherein the housing structure comprises a cooling air channel for cooling a housing portion to be cooled, and has an upstream end and a downstream end, wherein the cooling air channel extends, at least partially, between the housing wall and the inner wall.

13 Claims, 2 Drawing Sheets

(56) References Cited

U.S. PATENT DOCUMENTS

Figure 1:
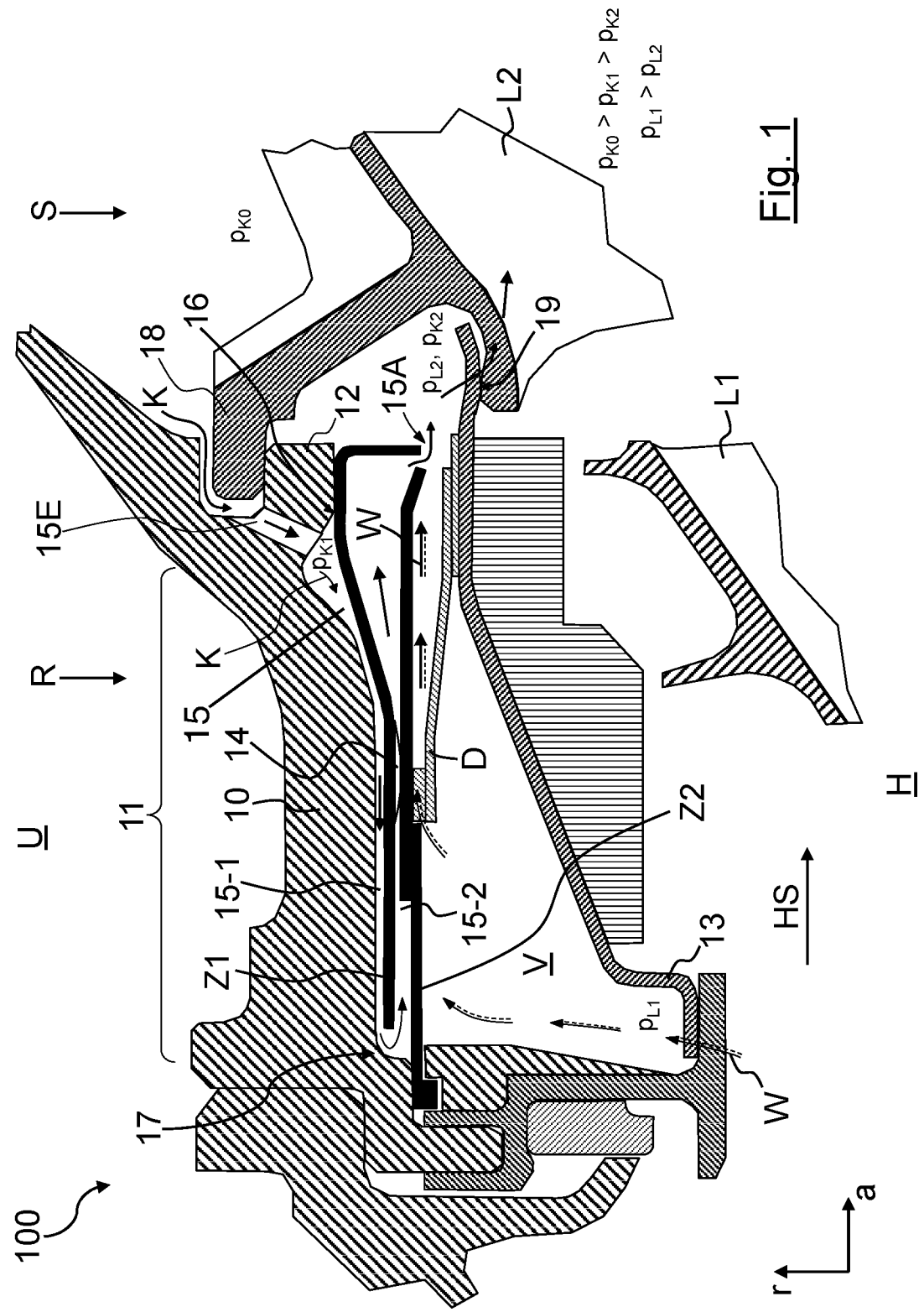

| | | | |
|---|---|---|---|
| 9,488,069 B2 | 11/2016 | Feldmann et al. | |
| 9,719,372 B2 * | 8/2017 | Ballard, Jr. | F01D 25/14 |
| 9,771,827 B2 | 9/2017 | Stanka et al. | |
| 9,903,275 B2 * | 2/2018 | Campomanes | F01D 9/04 |
| 9,963,994 B2 * | 5/2018 | Ballard, Jr. | F01D 11/24 |
| 10,221,717 B2 * | 3/2019 | Manchikanti | F01D 11/16 |
| 10,941,709 B2 * | 3/2021 | Dinu | F02C 7/18 |
| 2003/0035722 A1 * | 2/2003 | Barrett | F01D 9/04 |
| | | | 415/200 |
| 2004/0146399 A1 * | 7/2004 | Bolms | F23R 3/005 |
| | | | 415/175 |
| 2014/0112767 A1 | 4/2014 | Feldmann et al. | |
| 2014/0144155 A1 | 5/2014 | Down | |
| 2015/0030434 A1 | 1/2015 | Stanka et al. | |
| 2016/0017750 A1 | 1/2016 | Lefebvre et al. | |
| 2017/0175751 A1 * | 6/2017 | Moniz | F01D 25/12 |
| 2017/0211418 A1 | 7/2017 | Sedlov et al. | |
| 2017/0248152 A1 * | 8/2017 | Sreeram | F01D 5/048 |
| 2018/0100404 A1 * | 4/2018 | Taubler | F01D 11/005 |
| 2018/0363486 A1 * | 12/2018 | Smoke | F01D 25/12 |
| 2019/0178102 A1 * | 6/2019 | Synnott | F01D 5/185 |

FOREIGN PATENT DOCUMENTS

| | | |
|---|---|---|
| DE | 60202212 T2 | 6/2005 |
| DE | 112014004738 T5 | 7/2016 |
| DE | 10 2017 112426 A1 | 12/2017 |
| EP | 2518278 A1 | 10/2012 |
| EP | 2530279 A1 | 12/2012 |
| EP | 1642008 B1 | 9/2013 |
| EP | 2725203 A1 | 4/2014 |
| EP | 3199761 A1 | 8/2017 |
| GB | 2378730 B | 3/2005 |

* cited by examiner

HOUSING STRUCTURE FOR A TURBOMACHINE, TURBOMACHINE AND METHOD FOR COOLING A HOUSING PORTION OF A HOUSING STRUCTURE OF A TURBOMACHINE

BACKGROUND OF THE INVENTION

The present invention relates to a housing structure for turbomachinery, in particular for a turbomachine, particularly for a turbine stage of a turbomachine, wherein the housing structure is designed to surround annularly, at least partially, a main flow channel of the turbomachine, in which rotating blades and guide vanes are arranged, and to delimit the turbomachine with respect to the surroundings, wherein the housing structure has an outer housing wall, which is formed by at least one housing part, and an inner wall, and at least one cooling air channel, which runs at least partially in a volume between the housing wall and the inner wall for cooling a housing portion to be cooled of the housing wall.

The invention further relates to turbomachinery, in particular a turbomachine, in particular a gas turbine, in particular a low-pressure turbine that has a housing structure described above.

Furthermore, the invention relates to a method for cooling a housing portion of a housing structure of a turbomachine of this kind that has a housing structure described above.

Turbomachines that have generic housing structures are fundamentally known from the prior art, whereby various concepts in regard to the cooling of the housing portions of housing structures of this kind are known, in particular concepts relating to the delivery of cooling air, such as, for example, from EP 2 725 203 A1 or U.S. Pat. No. 6,179,557 B1.

As a rule, the better it is possible to cool a housing portion to be cooled of a housing wall of a housing structure, the lower are the thermal loads acting on the housing wall during operation and, as a rule, this has an advantageous effect on the housing wall, for example on its lifetime and, in consequence thereof, on its layout and dimensioning.

SUMMARY OF THE INVENTION

An object of one embodiment of the present invention is therefore to reduce the thermal loads that occur during operation and act on the housing wall.

This object is achieved by a housing structure, by a turbomachine, and by a method of the present invention. Advantageous embodiments of the invention are discussed in detail below.

A housing structure designed in accordance with the present invention for turbomachinery, in particular for a turbomachine, particularly for a turbine stage of a turbomachine, is designed to surround annularly, at least partially, a main flow channel of the turbomachine, in which rotating blades and guide vanes are arranged, in particular in the axial direction and at least partially in the peripheral direction in order to delimit the turbomachine with respect to the surroundings.

In this case, the housing structure has an outer housing wall, which is formed by at least one housing part, as well as an inner wall, and comprises at least one cooling air channel, which extends at least partially in a volume between the housing wall and the inner wall, for cooling a housing portion to be cooled of the housing wall.

The housing wall is designed to delimit the turbomachine with respect to the surroundings, in particular in the radial direction and at least partially in the peripheral direction. The inner wall is arranged in the radial direction inside of the housing wall and spaced apart from the housing wall in the radial direction and is designed to bound, at least partially, the main flow channel with the rotating blades and the guide vanes that are arranged in it, in particular in the radial direction and at least partially in the peripheral direction.

In relation to a main flow direction, along which a main flow flows through the main flow channel, the housing portion to be cooled has an upstream end and a downstream end.

The cooling air channel has a cooling air channel inlet for feeding cooling air into the cooling air channel and a cooling air channel outlet for discharging cooling air from the cooling air channel, wherein the cooling air channel has at least one portion in which cooling air that is conveyed into the cooling air channel via the cooling air channel inlet flows in the direction of the upstream end of the housing portion to be cooled.

In accordance with the invention, the cooling air channel inlet is arranged in the region of the downstream end of the housing portion to be cooled or is arranged downstream of said end, particularly at the downstream end of the housing portion to be cooled or downstream of the downstream end of the housing portion to be cooled.

In the present case, the term "turbomachine" refers to a device through which a fluid can flow and by means of which energy that is stored in a fluid flowing through the turbomachine can be converted to kinetic energy or, conversely, kinetic energy can be converted to fluid energy of a fluid flowing through the turbomachine, whereby the energy conversion generally takes place by means of appropriate profiles against which and, in particular, around which the fluid can flow, such as rotor blades, blades, or vanes, or the like, which are profiled in such a way that a pressure difference between the front side and back side arises at the respective profiles when the fluid flows around them.

A "turbomachine" in the sense of the present invention is turbomachinery that is designed as a power-generating machine, that is, turbomachinery by means of which the energy stored in the fluid flowing through the turbomachine can be converted to kinetic energy.

In the present case, a "turbine" is understood to mean a "turbomachine" in which the energy stored in the fluid flowing through the turbomachine is utilized to drive a shaft.

In the present case, the term "rotating blade" refers to a flow profile that is fastened to a rotatable shaft and, through a rotation of the associated shaft, can move relatively with respect to a housing structure that surrounds, at least partially, the rotatable shaft.

A "guide vane" in the sense of the present invention is a flow profile that is mounted in fixed position with respect to the housing structure and, in particular, is mounted at least partially in the housing structure.

In the present case, "main flow channel" refers to a flow channel through which a fluid that flows through the turbomachine can flow and in which the energy conversion of fluid energy to kinetic energy mainly takes place.

In the present case, the directional specification "axially" refers in each case, in the conventional technical sense, to a direction that is parallel to the rotational axis or the (main) machine axis of the turbomachinery, particularly in the case of a turbomachine; the directional specification "peripheral direction" correspondingly refers to a direction of rotation around this rotational axis or (main) machine axis; the directional specification "radially" refers to a direction that is perpendicular to the axial and peripheral directions. The directional specification "tangentially" correspondingly refers to a direction that is perpendicular to the axial direction and to the radial direction.

In the present case, the directional specifications "downstream" and "upstream" always refer to the direction of a main flow in a main flow channel of an associated turbomachine, whereby said main flow flows through the main flow channel during operation of the turbomachine.

In the present case, all directional specifications each refer to an installed state of the individual structural parts in turbomachinery, particularly in a turbomachine, or each refer to a functional state of use in connection with turbomachinery, particularly a turbomachine.

The expression "at least partially" in connection with a directional specification in this case means that the associated resulting directional vector has a component of the direction specified by the expression "at least partially."

In the present case, the term "wall" refers to a structural part, in particular a structural part that is fixed in position during operation of a turbomachine, which has at least one surface against which or around which a flow can or does flow, whereby, in particular in at least two directions—in the present case, particularly in the axial direction and in the peripheral direction—a wall has a markedly greater extension than in a third direction—in the present case, in particular in the radial direction.

In the present case, a "housing wall" accordingly refers to a wall of a housing.

In one embodiment of the present invention, the housing wall of a housing structure according to the invention extends, in particular, at least partially in the axial direction and at least partially in the peripheral direction, and is designed for delimiting the turbomachine with respect to the surroundings at least partially in the radial direction and at least partially in the peripheral direction.

Owing to the arrangement of the cooling air inlet in the region of the downstream end of the housing portion to be cooled or downstream of said end and owing to a cooling air that is conveyed at least partially opposite to the main flow direction, it is necessary for the delivery of cooling air to overcome a discharge pressure in the stage of the turbomachine that is surrounded at least partially by the housing portion to be cooled. It is thereby possible, in an especially simple manner, to achieve the cooling of a housing portion around a rotor stage, particularly in a low-pressure turbine.

Another advantage of a housing structure according to the invention is that a so-called "delivery pressure" of the cooling air, with which the cooling air can be introduced into the cooling air channel, is not dependent on the abrasive wear of other modules of the flow modules in the case of a housing structure according to the invention, as is the case, for example, for cooling air that is fed in upstream and has already flowed past one turbine stage or a plurality of turbine stages.

In one embodiment of the present invention, the inner wall is formed, in particular, by a shroud ring or by at least a shroud ring segment, particularly by a shroud ring that extends at least partially in the axial direction and at least partially in the peripheral direction, or by at least one appropriately constructed shroud ring segment, wherein the inner wall can also be formed by a plurality of shroud ring segments that are assembled together to create a shroud ring, in particular by shroud ring segments that are assembled together to create a shroud ring that is closed in the peripheral direction. In this way, it is possible, in a simple manner, to achieve a radial bounding of the main flow channel toward the outside.

Because the inner wall at least partially bounds the main flow channel, said inner wall is exposed to high temperatures, in particular in the case of a housing structure that is intended for a gas turbine in which very hot gas flows through the main flow channel. In an advantageous embodiment, therefore, the inner wall preferably comprises a high-temperature-resistant material or consists of a high-temperature resistant material, wherein the inner wall comprises metal or consists of metal, in particular a high-temperature-resistant metal. In this way, it is possible to achieve an especially stable and durable radial bounding of the main flow channel toward the outside.

In one embodiment of the present invention, the housing portion to be cooled is, in particular, a housing portion that is designed to surround at least one rotor stage, at least partially, wherein, in this case, at least one downstream end of the associated housing part is preferably formed by a housing hook or a plurality of housing hooks for receiving guide vane hooks of guide vanes of a following downstream stator stage, in particular of a guide vane cascade. In this way, it is possible, in an especially simple manner, to deliver cooling air from an outer region of the turbomachine to the cooling air channel, in particular to deliver cooling air that comes from a region that is radially outside of the guide vanes of a stator stage and, in particular, has not yet experienced any heating in any stage of a turbomachine.

In one embodiment of the present invention, the cooling air channel inlet is arranged in the housing part and, in particular, is formed by a passage opening in the housing part, particularly by a through bore that is introduced into the housing part, in particular downstream of the housing portion to be cooled, so that, in particular, cooling air can be conveyed to the cooling air channel from a following stage that is arranged downstream of the housing portion to be cooled. In this way, it is possible in an especially simple manner and, in particular, without any excessive weakening of the housing structure, in particular without any weakening of the housing structure in the region of the rotor, in which a high puncture strength is of importance, to achieve an adequate delivery of the cooling air for an efficient cooling of the housing portion to be cooled. In particular, it is possible in this manner to cool the housing portion to be cooled by way of a cooling length in the axial direction that is as long as possible, particularly without having to provide for cooling air inlets in the housing structure in the region of the rotor, which, as a rule, have a detrimental effect on the puncture resistance of the housing structure in the region of the rotor.

In one embodiment of the present invention, the housing portion to be cooled has a closed outer wall in the region relevant to puncture resistance; that is, there is no cooling air channel inlet and/or no cooling air channel outlet, in particular no perforation or the like, in order to prevent any weakening of the housing portion to be cooled in this region, and, in particular, to improve the puncture strength in this region.

In the present case, a "rotor stage" refers to an axial portion of turbomachinery, in particular of a turbomachine, particularly of a turbine, in which rotating blades are situated, in particular a plurality of rotating blades that are arranged uniformly distributed in the peripheral direction, which are fastened to a rotatable shaft and extend outwardly from the shaft in the radial direction and form a rotating blade ring.

In one embodiment of the present invention, if the housing portion to be cooled surrounds a rotor stage, the cooling air channel inlet is introduced, in particular, in such a way that cooling air can be conveyed to the cooling air channel from a region of a following stator stage, in particular by way of a housing hook or a plurality of housing hooks provided in the housing part at the downstream end of the housing part. That is, in one embodiment of the present invention, the cooling air channel inlet, in particular a passage opening or through bore forming the cooling air channel inlet, is introduced, particularly into a housing hook and/or extends through a housing hook, by means of which at least one guide vane of a following stator stage is mounted in the housing, wherein, for an improved delivery of the cooling air in this region, the associated guide vane hook can have at least one recess. In this way, it is possible to achieve an especially efficient delivery of the cooling air.

In the present case, a "stator stage" refers to an axial portion of turbomachinery, in particular of a turbomachine, particularly of a turbine, in which guide vanes are situated, in particular a plurality of guide vanes that are arranged uniformly distributed in the peripheral direction, which are mounted in fixed position with respect to the surrounding housing structure, and, in particular, are mounted at least partially in the housing structure, wherein, in particular, the guide vanes extend inwardly in the radial direction from the housing and form a guide vane ring.

In one embodiment of the present invention, the cooling air channel outlet is arranged, in particular, likewise in the region of the downstream end of the housing portion to be cooled, at the downstream end of the housing portion to be cooled, or downstream of the downstream end of the housing portion to be cooled. In this way, it is possible to achieve an especially efficient delivery of the cooling air. In particular, in this case, it is necessary for discharge from the cooling channel to overcome only a pressure that is applied at the outlet of the downstream end of the associated stage, the surrounding housing portion of which is to be cooled, and not the pressure applied at the inlet of this stage. This makes possible a delivery of the cooling air with a lower cooling air pressure, so that an adequate cooling air pressure can be achieved even with a moderate raising of the pressure in a following stage of the turbomachine. In particular, it is possible, even with only a moderate increase of the pressure in a guide vane cavity arranged downstream of the rotor stage, to achieve a pressure necessary for an adequate cooling for the delivery of cooling air.

In particular, a design of this kind makes possible an upstream conveyance of cooling air, at least partially, with a moderate, additional leakage at the radial outer ends of the guide vanes, from the following, downstream stator stage, whereby this design makes possible in a simple manner, in particular, the provision of a pressure that is adequate for conveying the cooling air in the cooling channel for an adequate cooling of the upstream rotor stage.

In one embodiment of the present invention, if the housing portion to be cooled surrounds a rotor stage, the cooling air channel outlet is arranged, in particular, axially at the level of an associated housing hook that lies in the radial direction, in particular in the radial direction inside of this housing hook. In this way, it is possible in an especially simple manner to achieve an advantageous and, in particular, efficient delivery of cooling air.

In one embodiment of the present invention, the cooling air channel has, in particular, a first portion and a second portion, wherein the housing structure, in particular the cooling air channel, is designed in such a way that cooling air conveyed into the cooling air channel via the cooling air channel inlet flows in the first portion in the direction of the upstream end of the portion to be cooled, in particular directly adjacent to the housing portion to be cooled in the axial direction opposite to a main flow direction, and flows in the second portion in the direction of the downstream end of the housing portion to be cooled, wherein a cooling air flow is diverted in the transition from the first portion to the second portion, in particular diverted by 180°. In this way, it is possible to achieve an especially efficient cooling of the housing portion to be cooled, because the still cold cooling air is conveyed first along the housing portion to be cooled, in particular in the axial direction.

In an enhancement of the present invention, the housing structure is designed, in particular, in such a way that the cooling air flow can be diverted, in particular, in the region of the downstream end of the housing portion to be cooled and/or is diverted there. In this way, it is possible in a simple manner to lengthen the cooling air path and, in consequence thereof, to improve the cooling.

In one embodiment of the present invention, the housing structure has, in particular, at least one intermediate wall, which extends at least partially in the axial direction and at least partially in the peripheral direction, while in the radial direction it extends between the housing wall and the inner wall; in particular there are at least two intermediate walls arranged in the radial direction between the housing wall and the inner wall. In this way, it is possible in an especially simple manner to create a cooling air channel that is spaced apart from the inner wall and thus the hot main flow channel, as a result of which it is possible to reduce substantially any heating of the cooling air owing to hot flow in the main flow channel.

As a result of the additional intermediate wall, it is possible, furthermore, to improve the puncture resistance of the housing structure.

In one embodiment of the present invention, the housing structure has, in particular, a first intermediate wall, which is arranged further outward in the radial direction, and a second intermediate wall, which is arranged at least partially, in particular completely, in the radial direction inside of the first intermediate wall. In particular, the first intermediate wall and the second intermediate wall are thereby arranged concentrically with respect to each other and, in particular, can be arranged concentrically with respect to the rotational axis or to the (main) machine axis. In this way, it is possible in a simple manner to accomplish a diversion of the cooling air by 180° and to achieve a lengthening of the cooling length. Moreover, it is possible in this way to reduce still further any heating of the cooling air that flows directly past the housing portion to be cooled, said heating being due to the hot flow in the main flow channel. It is likewise possible by way of a second intermediate wall to achieve a further improvement in the puncture resistance.

In one embodiment of the present invention, the cooling air channel is bounded, at least partially, in particular in the first portion, in the radial direction, particularly by an inner surface of the housing portion to be cooled of the housing wall and by an outer surface of a first intermediate wall, which extends at least partially in the axial direction and is arranged in the radial direction between the housing wall and the inner wall. In this way, it is possible in an especially simple manner to achieve an advantageous delivery of cooling air.

In one embodiment of the present invention, the first intermediate wall is arranged, in particular, spaced apart from the housing wall, particularly at a defined distance, and, if need be, with a spacer or a plurality of spacers in between, wherein a spacer or a plurality of spacers can be formed by a wave-shaped or nub-shaped contour in the axial direction of the first intermediate wall. Alternatively, this purpose can also be served by appropriate projections that are arranged on the side of the intermediate wall that faces the housing wall, by ribs, particularly axially extending ribs, or the like, as spacers. In this way, it is possible in an especially simple manner to achieve an advantageous delivery of cooling air and, in particular, to create a cooling air channel with defined dimensions.

In one embodiment of the present invention, the first intermediate wall is applied by its downstream end, in particular, in the region of the downstream end of the housing wall, in particular downstream of the cooling air channel inlet, against the inner surface of the housing wall, in particular with a defined contact force, for axial bounding of the cooling air channel downstream, in particular for axial bounding of the first portion of the cooling air channel downstream. For this purpose, the first intermediate wall can, for example, be pressed against the housing wall and/or be fastened to the housing wall. In this way, it is possible in an especially simple manner to achieve an advantageous delivery of cooling air, particularly an axial sealing that is advantageous for the delivery of cooling air.

In one embodiment of the present invention, the first intermediate wall is formed, in particular, by a first ring that is closed in the peripheral direction or by at least one ring segment, wherein the ring can be formed in one piece or else can be assembled from a plurality of ring segments, both in the peripheral direction and/or in the axial direction. In this way, it is possible to achieve an advantageous delivery of cooling air in a way that is especially simple in terms of construction.

In one embodiment of the present invention, the first intermediate wall comprises metal or consists of it, in particular a high-strength material. In this way, the puncture strength of the housing structure can be increased, in some cases even in such a way that a reduced dimensioning of the housing wall becomes possible, as a result of which a reduction in weight also becomes possible and costs can be saved on account of a lesser material requirement for the housing wall.

In one embodiment of the present invention, the cooling air channel is bounded outwardly, at least partially and particularly in the second portion, in the radial direction by an inner surface of the first intermediate wall. In this way, it is possible in an especially simple manner to achieve an advantageous delivery of cooling air.

In one embodiment of the present invention, the cooling air channel is bounded inwardly, at least partially and particularly in the second portion, in the radial direction by an outer surface of a second intermediate wall, which extends at least partially in the axial direction and is arranged in the radial direction between the first intermediate wall and the inner wall. In this way, it is possible in an especially simple manner to achieve an advantageous delivery of cooling air.

In one embodiment of the present invention, in this case, the second intermediate wall is arranged, in particular, spaced apart from the first intermediate wall, particularly at a defined distance, and, if need be, with a spacer or a plurality of spacers in between, wherein a spacer or a plurality of spacers can be formed by a wave-shaped contour in the axial direction of the first intermediate wall and/or the second intermediate wall. Alternatively, this purpose can also be served by appropriate projections that are arranged on the side of the intermediate wall that faces the housing wall, by ribs, particularly axially extending ribs, or the like, as spacers. In this way, it is possible in an especially simple manner to achieve an advantageous delivery of cooling air and, in particular, to create a cooling air channel with defined dimensions.

In one embodiment of the present invention, the second intermediate wall is arranged, in particular, spaced apart from the inner wall. In this way, it is possible in an especially simple manner to reduce substantially the heating of the cooling air due to the hot flow in the main flow channel.

In one embodiment of the present invention, the second intermediate wall is applied by its upstream end, in particular in the region of the upstream end of the housing wall, particularly upstream of a diversion in the cooling air channel, against the inner surface of the housing wall, in particular with a defined contact force, for axial bounding of the cooling air channel upstream, in particular for axial bounding of the second portion of the cooling air channel upstream. For this purpose, the second intermediate wall can, for example, be pressed against the housing wall and/or be fastened to the housing wall and/or be clamped against the housing wall. In this way, it is possible in an especially simple manner to achieve an advantageous delivery of cooling air, particularly an axial sealing that is advantageous for the delivery of cooling air.

In one embodiment of the present invention, the second intermediate wall is formed, in particular, by a first ring, which is closed in the peripheral direction, or by at least one ring segment, wherein the ring can be formed in one piece or can be assembled from a plurality of ring segments, both in the peripheral direction and/or in the axial direction. In this way, it is possible to achieve a delivery of cooling air that is especially simple in terms of design and is particularly advantageous.

In one embodiment of the present invention, the second intermediate wall comprises metal or consists of it, in particular a high-strength material. In this way, the puncture strength of the housing structure can be further increased.

In one embodiment of the present invention, the first intermediate wall and the second intermediate wall are formed separately, that is, as separate structural parts, in particular in the form of two rings that are arranged coaxially to each other and, in particular, can be inserted axially into each other. In this way, it is possible in an especially simple construction to achieve an advantageous delivery of cooling air.

In one embodiment of the present invention, the first intermediate wall and the second intermediate wall can be preassembled with each other to form a subassembly, and, in particular, are joined to each other in a detachable manner. In this way, it is possible to achieve an especially simple delivery of cooling air, which, in particular, enables a simple assembly.

In one embodiment of the present invention, the cooling air channel outlet is formed, in particular, by an opening, in particular by a gap, particularly by an at least partially circumferential gap, in particular by a completely circumferential gap, between the first intermediate wall and the second intermediate wall, wherein the cooling air outlet channel is formed, in particular, by a gap between the downstream end of one of the two intermediate walls and the other intermediate wall or by a gap between the two downstream ends of both intermediate walls. In this way, it is possible to achieve a delivery of cooling air that is especially simple in terms of construction, and can be advantageously and flexibly configured, in particular.

In one embodiment of the present invention, the cooling air channel outlet is situated, in particular, in the region of the downstream end of the housing wall, in particular downstream of the rotor stage. In this way, it is possible to achieve an especially advantageous delivery of the cooling air, in particular a delivery of cooling air that requires only a low cooling air pressure.

In one embodiment of the present invention, at least one intermediate wall, in particular the first intermediate wall, has, in particular at its downstream end, a cooling air guide portion, which is designed to exert an influence at or in a region in front of the cooling air channel outlet on a flow direction of a cooling air flow, in particular to alter it, wherein the cooling air guide portion extends, in particular, in the radial direction and forms, in particular, the downstream end of the associated intermediate wall and forms, in particular together with the other intermediate wall, particularly together with its downstream end, the cooling air channel outlet. In this way, it is possible to achieve a delivery of cooling air that is especially simple in terms of construction and can be configured, in particular, advantageously and flexibly, particularly with a targeted influencing of the cooling air flow.

In one embodiment of the present invention, the housing structure is designed, in particular, in such a way that cooling air flowing out of the cooling air channel can enter the main flow channel downstream of the cooling air channel outlet, in particular through a gap between the inner wall and another structural part. In this way, it is possible in an especially simple manner, to achieve a discharge of cooling air.

In one embodiment of the present invention, if the housing portion to be cooled surrounds a rotor stage, the other structural part is, in particular, a guide vane of a stator stage that is arranged downstream of the rotor stage.

In one embodiment of the present invention, the cooling air in this case can be discharged, in particular, into the main flow channel with a cooling air flow direction that is matched to the flow direction of a flow flowing in the main flow. In this way, it is possible to reduce and even totally prevent undesired effects that influence in a negative manner the main flow, and thus, in particular, negatively influence the efficiency of the turbomachine.

In one embodiment of the present invention, at least one sealing element, which extends at least partially in the axial direction and at least partially in the peripheral direction, is arranged in the radial direction between the housing wall and the inner wall, wherein the sealing element is arranged, in particular, in the radial direction between an innermost intermediate wall, which bounds the cooling air channel, and the inner wall.

In one embodiment of the present invention, the sealing element is designed, in particular, to reduce a flow through the volume of hot fluid that has been discharged from the main flow channel due to leakages, so as to improve the cooling of the housing portion and/or to increase the efficiency of the cooling.

In one embodiment of the present invention, the sealing element is arranged, in particular, in the radial direction, between the second intermediate element and the inner wall.

In one embodiment of the present invention, the sealing element, in particular together with the innermost intermediate wall, bounds a hot air channel in the radial direction, wherein the inner surface of the innermost intermediate wall bounds the hot air channel at least partially, in particular outwardly in the radial direction, and the outer surface of the sealing element bounds the hot air channel at least partially, in particular inwardly in the radial direction.

In an enhancement of the present invention, the sealing element, in particular together with the innermost intermediate wall, in this case bounds the hot air channel in the axial direction in such a way that the hot air channel will be and/or is narrowed in the axial direction down to a small flow gap. In this way, it is possible in an especially simple manner to achieve a notable reduction in the hot flow through the volume between the housing wall and the inner wall, in particular between the innermost intermediate wall and the inner wall.

In one embodiment of the present invention, the sealing element has another wall or is an additional wall, wherein the sealing element is formed, in particular, by an additional ring, wherein the sealing element, in particular, comprises metal or consists of it. In this way, it is possible to create a corresponding sealing element in a manner that is simple in terms of construction.

In one embodiment of the present invention, the sealing element has, in particular, a smaller axial extension than the first and/or second intermediate wall, wherein, in the axial direction, the sealing element has, in particular, only about half the length of the first and/or second intermediate wall. In this way, it is possible in an especially simple manner to achieve a notable reduction in the hot flow through the volume between the housing wall and the inner wall, in particular between the innermost intermediate wall and the inner wall.

In an alternative embodiment of the present invention, the sealing element has a voluminous sealing body or is a voluminous sealing body, which fills a volume between the innermost intermediate wall and the inner wall at least partially, in particular up to at least 50%, preferably up to at least 75%, more preferably up to at least 85%, wherein, in this case, the sealing element has, in particular in the axial direction, preferably roughly the same extension as the innermost intermediate wall. In this way, it is possible in an especially simple manner to achieve a substantial reduction in the hot flow through the volume between the housing wall and the inner wall, in particular between the innermost intermediate wall and the inner wall.

In an enhancement of the present invention, the sealing element has a voluminous sealing body, which is designed to be thermally insulating. In this way, it is possible in an especially simple manner to achieve, in addition to the reduction in the hot flow through the volume between the housing wall and the inner wall, in particular between the innermost intermediate wall and the inner wall, also a thermal insulation of the cooling air channel.

A turbomachine according to the invention has a housing structure according to the invention. In this way, it is possible in an especially simple manner to achieve an efficient cooling of a housing portion of the turbomachine to be cooled.

In one embodiment of a turbomachine in accordance with the present invention, the turbomachine has a rotor stage with rotating blades and a stator stage with guide vanes, which is arranged downstream of the rotor stage, wherein the housing portion to be cooled of the housing structure surrounds at least the rotor stage, at least partially, wherein the turbomachine, in particular the housing structure, is designed in such a way that cooling air from the stator stage arranged downstream of the rotor stage can be conveyed to at least one cooling air channel, in particular from radially outside of the guide vanes of the downstream stator stage, in particular at least partially opposite to a main flow direction of a main flow in the main flow channel. In this way, it is possible in an especially simple manner to achieve an efficient cooling of a housing portion to be cooled of a rotor stage of the turbomachine.

In one embodiment of a turbomachine in accordance with the present invention, cooling air can be conveyed to at least one cooling air channel, in particular via at least one cooling air channel inlet that is introduced into a housing hook of the housing part of the housing structure arranged at the downstream end of the housing part, wherein the housing hook is designed for receiving at least one guide vane hook of at least one guide vane of the downstream stator stage. In this way, it is possible in an especially simple manner to achieve an efficient cooling of a housing portion to be cooled.

In one embodiment of a turbomachine in accordance with the present invention, the inner wall of the housing structure forms a discharge gap at its downstream end with at least one guide vane of the stator stage that is adjacent to the rotor stage, by way of which the cooling air that is discharged from the cooling air channel can be discharged into the main flow channel, in particular together with a hot leakage flow that has emerged from the main flow channel due to leakages. In this way, it is possible in an especially simple manner to achieve a discharge of cooling air.

A method according to the invention for cooling a housing portion of a housing structure of a turbomachine according to the invention is characterized in that cooling air is conveyed to the cooling air channel of the housing structure, the housing portion of which is to be cooled, this portion surrounding, at least partially, the rotor stage arranged upstream of the stator stage, by way of the cooling air channel inlet from a region radially outside of the guide vanes of the stator stage, wherein, for this purpose, the turbomachine is operated, in particular, in such a way that the pressure in this region is higher than a discharge pressure of a flow in the region of the cooling air channel outlet. In this way, it is possible in an especially simple manner to achieve an efficient cooling of the housing portion to be cooled.

All of the features, characteristics, and advantages described in connection with one subject of the invention apply, insofar as they can be implemented technically and are applicable, also to the other subjects in accordance with the invention, even when they are not explicitly mentioned in connection with these subjects. That is, the features, characteristics, and advantages described in connection with a housing structure according to the invention also apply to a turbomachine according to the invention as well as to a method according to the invention and vice versa, insofar as this can be implemented technically or is applicable.

BRIEF DESCRIPTION OF THE DRAWING FIGURES

Figure 2:
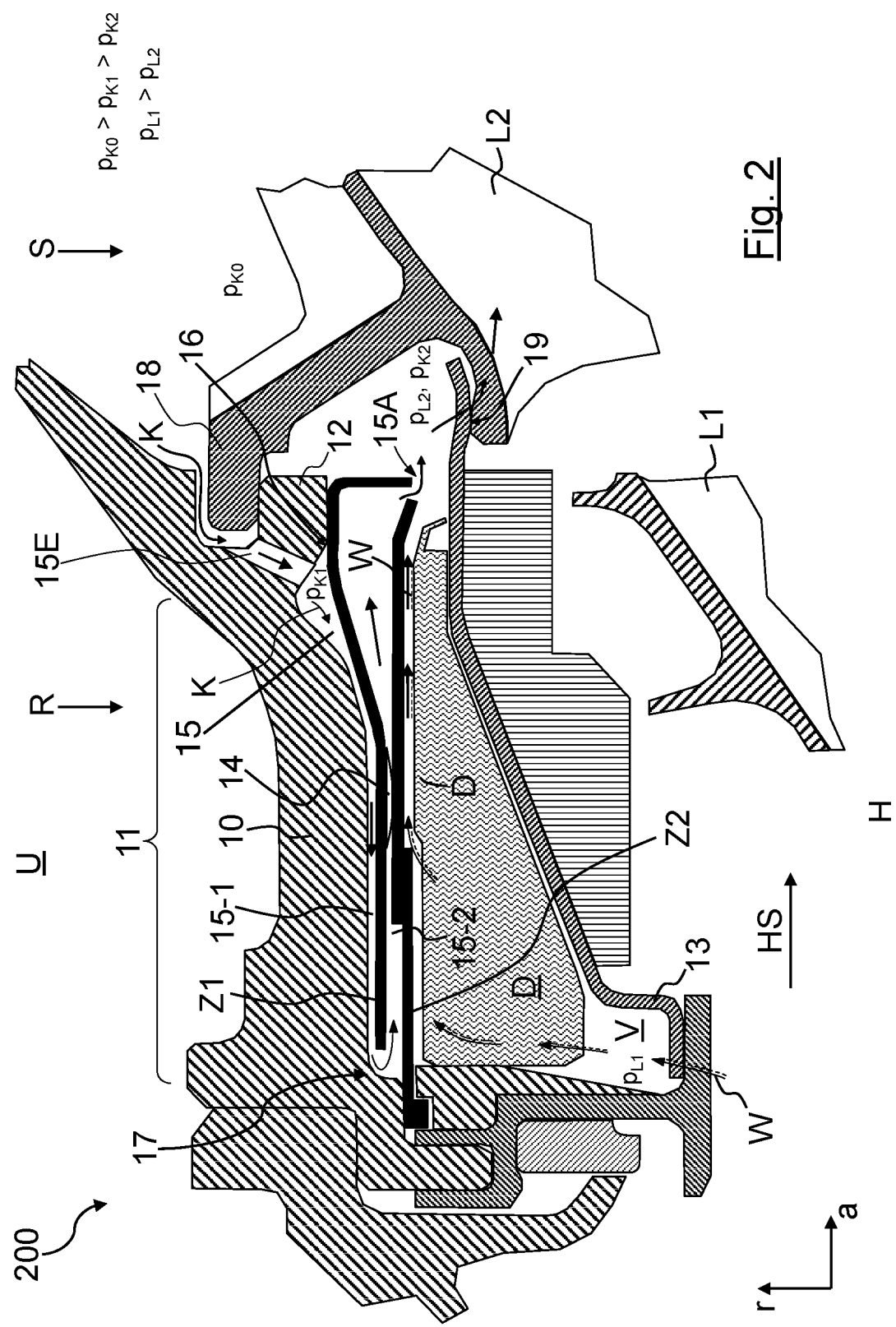

Additional advantageous enhancements of the present invention ensue from the dependent claims and from the following description of preferred embodiments. For this purpose and in a partly schematic manner:

FIG. 1 shows an excerpt of a first exemplary embodiment of a turbomachine according to the invention with a first exemplary embodiment of a housing structure according to the invention, and FIG. 2 shows an excerpt of a second exemplary embodiment of a turbomachine according to the invention with a second exemplary embodiment of a housing structure according to the invention.

DESCRIPTION OF THE INVENTION

FIG. 1 shows an excerpt of a first exemplary embodiment of a turbomachine according to the invention, which is designed as a low-pressure turbine and has a rotor stage R and a stator stage S, which is arranged downstream of said rotor, wherein the rotor stage R has a plurality of rotating blades L1, which are arranged uniformly distributed in the peripheral direction and extend in the radial direction r, and the stator stage S has a plurality of guide vanes L2, which are arranged uniformly distributed in the peripheral direction and extend in the radial direction r.

In accordance with the invention, in this case, the turbomachine has a housing structure 100 according to the invention, which surrounds annularly at least partially a main flow channel H of the turbomachine, in which the rotating blades L1 and the guide vanes L2 are arranged, for delimitation with respect to the surroundings U, in particular the rotating blades L1 of the rotor stage R.

In this case, the housing structure 100 has an outer housing wall 10, which is formed by at least one housing part, and an inner wall 13, which is made of a high-temperature-resistant material and is formed by a plurality of ring segments that are assembled together to create a shroud ring. The inner wall 13 is arranged here in the radial direction r inside of the housing wall 10 and spaced apart in the radial direction r from the housing wall 10 and is designed to bound, at least partially, the main flow channel H with the rotating blades L1 and the guide vanes L2 arranged in it.

In a volume V between the housing wall 10 and the inner wall 13, there extends a cooling air channel 15 for carrying cooling air K for cooling a housing portion 11 to be cooled of the housing wall 10, wherein, during operation of the turbomachine, in relation to a main flow direction HS, along which a main flow channel H extends, the housing portion 11 to be cooled has an upstream end 17 and a downstream end 16.

In this case, the cooling air channel 15 has a cooling air channel inlet 15E for feeding cooling air K into the cooling air channel 15 and a cooling air channel outlet 15A for discharging cooling air K from the cooling air channel 15.

In accordance with the invention, the cooling air channel inlet 15E is arranged in the region of the downstream end 16 of the housing portion 11 to be cooled. In this case, the cooling air channel outlet 15A is likewise arranged in the region of the downstream end 16 of the housing portion 11 to be cooled.

In the case of the housing structure 100 illustrated in FIG. 1, the cooling air channel 15 has a first portion 15-1 as well as a second portion 15-2, wherein the first portion 15-1 abuts, in particular, the cooling air channel inlet 15E and the second portion 15-2 abuts, in particular, the cooling air channel outlet 15A and wherein, in the first portion 15-1, cooling air that is conveyed to the cooling air channel 15 via the cooling air channel inlet 15E flows in the direction of the upstream end 17 of the housing portion 11 to be cooled, whereas, in the second portion 15-2, the cooling air K, once it has been diverted by 180° in the region of the upstream end 17, flows in the direction of the downstream end 16. In this way, it is possible to achieve an especially advantageous delivery of the cooling air. By way of the diversion, it is possible to achieve an especially long cooling path.

The cooling air channel 15 is formed, among other things, by means of two intermediate walls Z1 and Z1, which extend at least partially in the axial direction and at least partially in the peripheral direction and are arranged in the radial direction r between the housing wall 10 and the inner wall 13, wherein the cooling air channel 15 in the first portion 15-1 is bounded in the radial direction r by an inner surface of the housing portion 11 to be cooled of the housing wall 10 and by an outer surface of the first intermediate wall Z1. In this way, in the region of the first cooling air channel portion 15-1, it is possible for fresh, cold cooling air K to flow directly along the housing portion 11 to be cooled, as a result of which an especially good cooling effect is achieved.

In this case, the first intermediate wall Z1 is applied by its downstream end in the region of the downstream end 16 of the housing wall 10, in particular downstream of the cooling air channel inlet 15E, against the inner surface of the housing wall 10, in particular with a defined contact force, for axial bounding of the first portion 15-1 of the cooling air channel 15 downstream.

In the second portion 15-2, the cooling air channel 15 is bounded outwardly in the radial direction r by an inner surface of the first intermediate wall Z1 and inwardly in the radial direction r by an outer surface of the second intermediate wall Z2.

In this case, the second intermediate wall Z2 is applied by its upstream end in the region of the upstream end 17 of the housing wall 10, in particular upstream of a diversion in the cooling air channel 15, against the inner surface of the housing wall 10, likewise with a defined contact force, for axial bounding of the second portion 15-2 of the cooling air channel 15 upstream, wherein the second intermediate wall Z2 is pressed here against the housing part by a structural part that is joined to the housing part, but is not indicated here in greater detail.

The intermediate walls Z1 and Z2 are each formed by rings made of a high-strength metal material, which are inserted into each other and which, in addition to their function as cooling channel walls, additionally serve to increase the puncture strength of the housing structure 100.

For defined dimensions of the cooling air channel 15, it is possible to provide spacers 14 between the first and second intermediate walls Z1, Z2.

In the case of this housing structure 100, the cooling air channel outlet 15A is formed by an opening, in particular by a gap, particularly by an at least partially circumferential gap, in particular by a completely circumferential gap, between the first intermediate wall Z1 and the second intermediate wall Z2, in particular, in each case, by their downstream ends. For an especially advantageous delivery of the cooling air, the two intermediate walls Z1 and Z2 each have here corresponding air guide portions in the region of their downstream ends, which are not indicated in greater detail here and with which it is possible to influence the flow direction of the cooling air, so that the cooling air K can flow with a defined particularly advantageous direction out from the cooling air channel 15 and, via a gap 19 between the inner wall 13 and another structural part, such as, for example, a guide vane L2 of the following stator stage S, can enter the main flow channel H, in particular with a flow direction that is matched to the flow direction of the main flow and, in particular, together with a leakage flow.

Furthermore, between the housing wall 10 and the inner wall 13, this housing structure 100 has radially at least one sealing element D, which extends at least partially in the axial direction and at least partially in the peripheral direction and which likewise is formed as a circumferential metal ring, wherein the sealing element D is arranged, in particular, in the radial direction r between the innermost intermediate wall Z2, which bounds the cooling air channel 15, and the inner wall 13. In this case, the sealing element D extends only over roughly half of the length of the housing portion 11 to be cooled or of the intermediate walls Z1 and Z2 and is applied by its downstream end against the inner wall 13 in a sealing manner. The upstream end of the sealing element D, together with the inner surface of the second intermediate element Z2, defines a small gap in order to keep as small as possible any flow through the volume V of a hot flow W that, owing to leakage effects, enters the volume V from the main flow channel, particularly in the immediate vicinity of the cooling channel 15.

For cooling of the housing portion 11, cooling air K is conveyed from a region radially outside of the guide vanes L2 of the stator stage S to the cooling air channel 15 of the housing structure 100, the housing portion 11 of which to be cooled surrounds, at least partially, the rotor stage R arranged upstream of the stator stage S, via the cooling air channel inlet 15E, which, in particular, is formed by a through bore in a housing hook 18 of the housing part, wherein, for this purpose, the turbomachine is operated, in particular, in such a way that a cooling air pressure $p_{K0}$ in this region is greater than a discharge pressure $p_{K2}$ or $p_{L2}$ of a flow in the region of the cooling air channel outlet 15A, in particular greater than a discharge pressure $p_{L2}$ of the discharging hot leakage flow W as well as greater than a discharge pressure $p_{K2}$ of a cooling air flow K discharging from the cooling air channels 15-1 and 15-2 at the cooling air channel outlet 15A or greater than a pressure of a flow that is a mixture of these two flows.

For this purpose, the cooling air pressure $p_{K0}$ required at the cooling air channel inlet 15E can, in particular, be produced by means of a compressor, which is not illustrated, wherein, in this case, the cooling air K required for this is taken, in particular, from the compressor, and is conveyed by way of lines into the volume radially outside of the guide vanes L2 of the stator stage S, where it is then placed under the corresponding air pressure $p_{K0}$.

Along the cooling air channels 15-1 and 15-2 from the cooling air channel inlet 15E up to the cooling air channel outlet 15A, the cooling air pressure drops from $p_{K0}$ past $p_{K1}$ down to $p_{K2}$.

Likewise, a pressure of the hot leakage flow drops in the flow direction from $p_{L1}$ to $p_{L2}$.

Owing to the pressure drop of the hot leakage flow W and the pressure drop of the cooling air flow in the direction of the cooling air channel outlet 15A, only a small pressure $p_{K0}$ is required in order to introduce cooling air K into the cooling air channel 15-1 by way of the cooling air channel inlet 15E, which is arranged downstream in accordance with the invention.

Due to the second intermediate wall Z2 and the sealing element D, it is possible, in particular, to prevent any mixture with the hot leakage flow W beyond the region of the diversion of the cooling air. In consequence thereof, it is possible to prevent any pressure increase of the cooling air flow in the direction of the cooling air channel outlet 15A as a result of admixture with the hot leakage flow W, which initially has a leakage pressure $p_{L1}$.

Due to the sealing element D and the small gap that is produced by means of it and the second intermediate element Z2, it is possible, moreover, to augment a pressure drop of the hot leakage flow W, as a result of which it is possible to achieve a lower required cooling air pressure $p_{K0}$ at the cooling air channel inlet.

Accordingly, it is possible by use of a housing structure 100 according to the invention to achieve an efficient cooling in an especially simple manner.

FIG. 2 shows an excerpt of a second exemplary embodiment of a turbomachine according to the invention with a second exemplary embodiment of a housing structure 200 according to the invention, which differs solely in terms of the sealing element D' from the previously described housing structure.

In this case, the sealing element D' is a voluminous sealing element, which fills the volume between the innermost intermediate wall Z2 and the inner wall 13 up to at least 85%, wherein, in this case, the sealing element D' has nearly the same extension in the axial direction as the innermost intermediate wall Z2. In this way, it is possible in an especially simple manner to achieve a substantial reduction in the hot flow through the volume V.

In addition, the voluminous sealing element D' is designed to be thermally insulating. In this way, it is possible in an especially simple manner to also achieve, in addition to the reduction in the hot flow through the volume V, a thermal insulation of the cooling air channel 15 from the main flow channel H.

Even though, in the preceding description, exemplary embodiments were discussed, it is noted that a large number of modifications are possible. Moreover, it is noted that the exemplary embodiments are merely examples, which are not intended to limit the protective scope, the applications, and structure in any way. Instead, the preceding description provides the person skilled in the art with a guideline for implementing at least one of the exemplary embodiments, whereby diverse changes, in particular in regard to the function and arrangement of the described structural parts, can be made, without leaving the protective scope, as ensues from the claims and the combinations of features equivalent to said claims.

What is claimed is:

1. A housing structure for a turbomachine, wherein the housing structure surrounds annularly, at least partially, a main flow channel of the turbomachine, in which rotating blades and guide vanes are arranged, and to delimit the turbomachine with respect to the surroundings, wherein the housing structure comprises an outer housing wall, which is formed by at least one housing part, and an inner wall, and at least one cooling air channel, which extends, at least partially, in a volume between the housing wall and the inner wall, for cooling a housing portion to be cooled of the housing wall,
wherein the housing wall delimits the turbomachine with respect to the surroundings,
wherein the inner wall is arranged in a radial direction inside of the housing wall and spaced apart from the housing wall in the radial direction, and bounds, at least partially, the main flow channel together with the rotating blades and the guide vanes arranged therein,
wherein, in relation to a main flow direction, with which a main flow passes through the main flow channel, the housing portion to be cooled has an upstream end and a downstream end,
wherein the cooling air channel has a cooling air channel inlet for feeding cooling air into the cooling air channel and a cooling air channel outlet for discharging cooling air from the cooling air channel,
wherein the cooling air channel has a first portion and a second portion, the cooling air channel is configured and arranged such that cooling air that is conveyed to the cooling air channel via the cooling air channel inlet flows in the direction of the upstream end of the housing portion to be cooled,
wherein the cooling air channel inlet is arranged in a region of the downstream end of the housing portion to be cooled or is arranged downstream of said end,
wherein the housing structure has at least one intermediate wall, which extends, at least partially, in the axial direction and, at least partially, in a peripheral direction and is arranged in the radial direction between the housing wall and the inner wall, and
wherein the cooling air channel is bounded inwardly in the second portion in the radial direction by an outer surface of a second intermediate wall, which extends, at least partially, in the axial direction and is arranged in the radial direction between the first intermediate wall and the inner wall.

2. The housing structure according to claim 1, wherein the cooling air channel outlet is also arranged in the region of the downstream end of the housing portion to be cooled, at the downstream end of the housing portion to be cooled, or downstream of the downstream end of the housing portion to be cooled.

3. The housing structure according to claim 1, wherein the cooling air channel, is configured and arranged so that cooling air that is conveyed to the cooling air channel via the cooling air channel inlet flows in the first portion in the direction of the upstream end of the housing portion to be cooled, and flows in the second portion in the direction of the downstream end of the housing portion to be cooled, wherein a cooling air flow is diverted in a transition region of the cooling air flow from the first portion to the second portion by 180°.

4. The housing structure according to claim 1, wherein the cooling air channel in the first portion is bounded in the radial direction by an inner surface of the housing portion to be cooled of the housing wall and by an outer surface of an intermediate wall, which extends, at least partially, in the axial direction and is arranged in the radial direction between the housing wall and the inner wall.

5. The housing structure according to claim 4,
wherein the first intermediate wall is disposed at a downstream end of the housing wall downstream of the cooling air channel inlet, against the inner surface of the housing wall with a defined contact force, for axial bounding of the cooling air channel downstream for axial bounding of the first portion of the cooling air channel downstream.

6. The housing structure according to claim 1, wherein the cooling air channel is bounded outwardly in the second portion in the radial direction by an inner surface of the first intermediate wall.

7. The housing structure according to claim 1, wherein the second intermediate wall is applied by its upstream end in the region of the upstream end of the housing wall, upstream of a diversion in the cooling air channel, against the inner surface of the housing wall, with a defined contact force, for axial bounding of the cooling air channel upstream, for axial bounding of the second portion of the cooling air channel upstream.

8. The housing structure according to claim 1, wherein the cooling air channel outlet is formed by an opening between the first intermediate wall and the second intermediate wall.

9. The housing structure according to claim 1, wherein at least one sealing element, which extends at least partially in the axial direction and at least partially in the peripheral direction, is arranged radially between the housing wall and the inner wall, wherein the sealing element is arranged in the radial direction between an innermost intermediate wall, which bounds the cooling air channel, and the inner wall.

10. The housing structure according to claim 1, wherein the housing structure is configured and arranged as part of a low-pressure turbine.

11. The housing structure according to claim 10, wherein the turbomachine has a rotor stage with rotating blades and a stator stage with guide vanes, which is arranged downstream of the rotor stage, wherein the housing portion to be cooled of the housing structure surrounds at least the rotor stage, at least partially, radially, wherein the turbomachine is configured and arranged so that cooling air is conveyed to the cooling air channel from the stator stage arranged downstream with respect to the rotor stage from radially outside of the guide vanes of the downstream stator stage at least partially opposite to a main flow direction of a main flow in the main flow channel.

12. The housing structure according to claim 10 wherein the inner wall of the housing structure forms a discharge gap at its downstream end with at least one guide vane of the stator stage that is adjacent to the rotor stage, by way of which the cooling air that is discharged from the cooling air channel can be discharged into the main flow channel together with a hot leakage flow that, owing to leakages, is discharged from the main flow channel.

13. The housing structure according to claim 11, wherein the cooling air is conveyed to the cooling air channel of the housing structure, the housing portion of which to be cooled surrounds, at least partially, the rotor stage arranged upstream of the stator stage, by way of the cooling air channel inlet from a region radially outside of the guide vanes of the stator stage, wherein, for this purpose, the turbomachine is operable such that a cooling air pressure in this region is greater than a discharge pressure of a flow in the region of the cooling air channel outlet.

* * * * *